June 2, 1931.   M. H. LOUGHRIDGE   1,807,596
SPEED CONTROL SYSTEM AND APPARATUS
Filed April 18, 1927   4 Sheets-Sheet 2
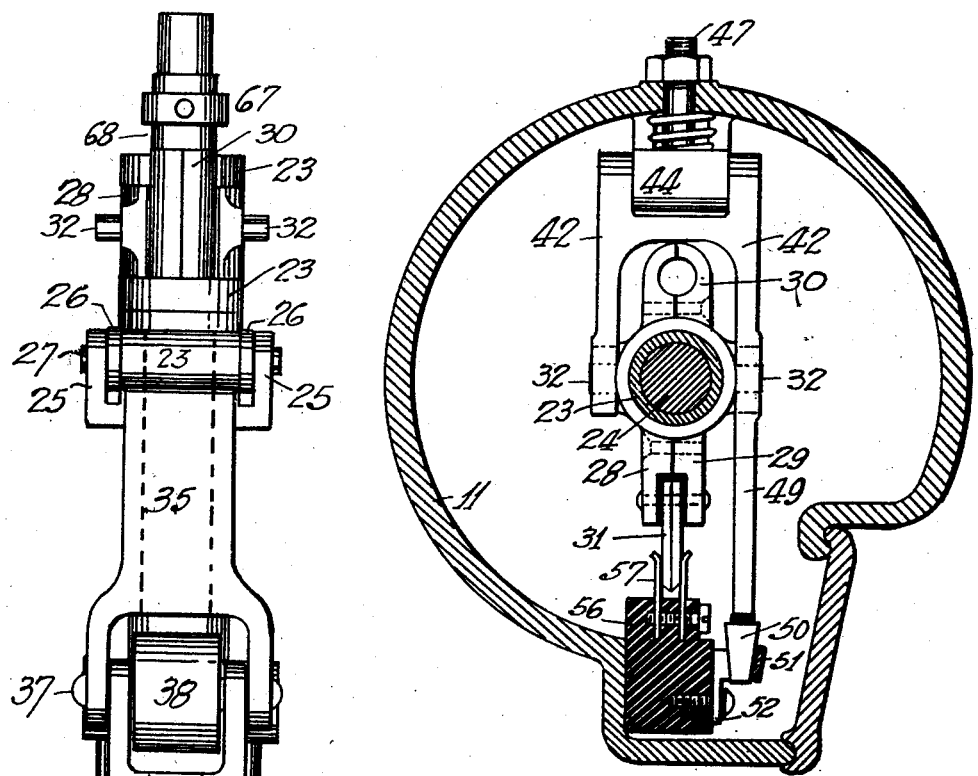
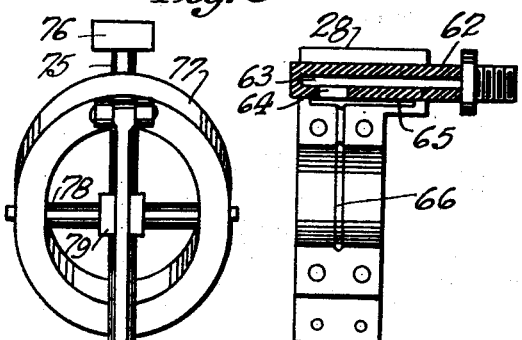
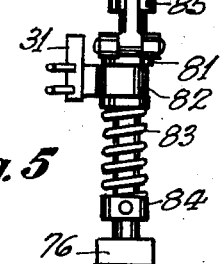
Fig. 2
Fig. 3
Fig. 4
Fig. 5
INVENTOR.
Matthew H. Loughridge

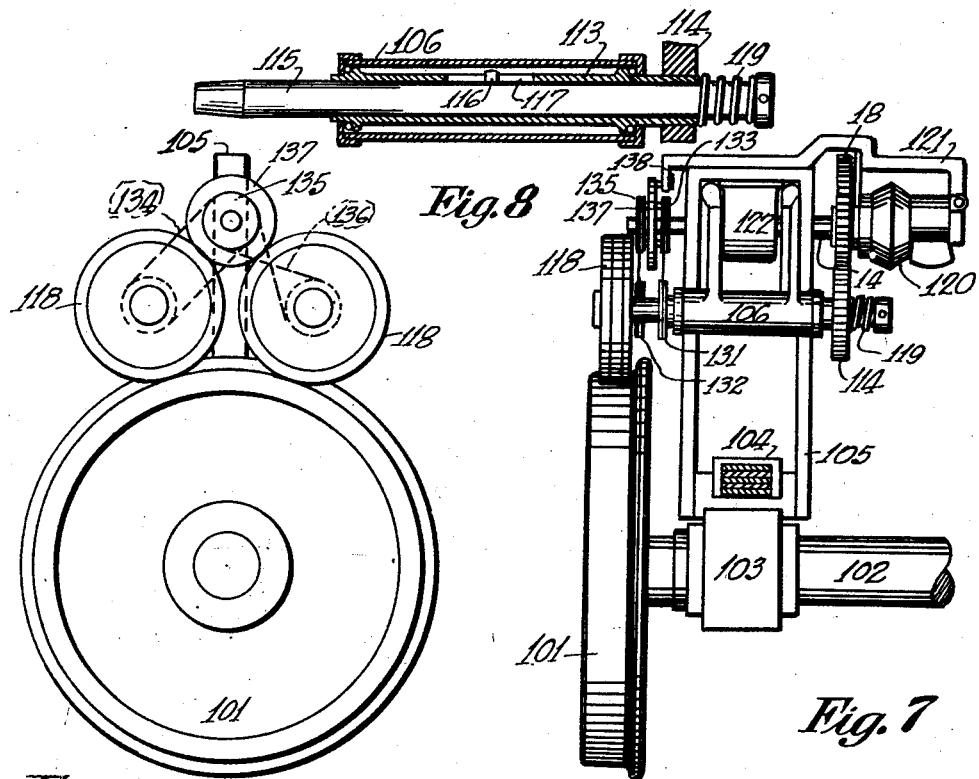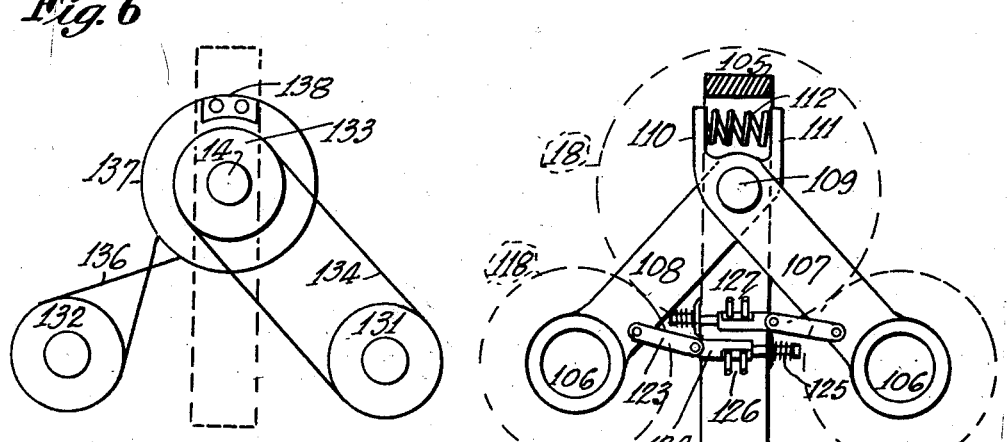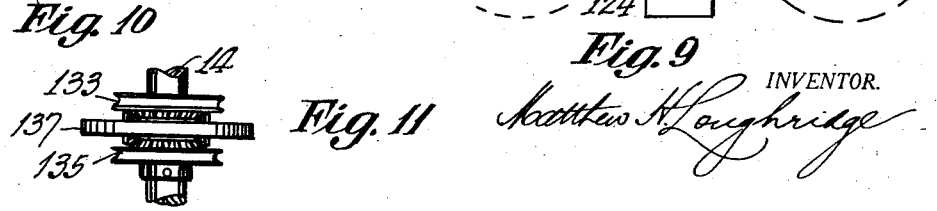

June 2, 1931. M. H. LOUGHRIDGE 1,807,596
SPEED CONTROL SYSTEM AND APPARATUS
Filed April 18, 1927 4 Sheets-Sheet 4

INVENTOR.
Matthew H. Loughridge

Patented June 2, 1931

1,807,596

UNITED STATES PATENT OFFICE

MATTHEW H. LOUGHRIDGE, OF BOGOTA, NEW JERSEY

SPEED CONTROL SYSTEM AND APPARATUS

Application filed April 18, 1927. Serial No. 184,778.

This invention relates to a speed control system and apparatus of the centrifugal type and has for an object to provide a speed control device which is capable of detecting its own failure, a driving mechanism for the device which is capable of detecting its own failure, also the provision of means for remotely controlling the application of the speed control device on a vehicle such as a railroad train and means for controlling the operation of the device on a train from the trackway. Other objects of the invention will be understood from the following specification and the accompanying drawings, in which, Fig. 1 is a cross-section of a centrifuge embodying my invention;

Fig. 2 is a plan view of the shaft, arms and weight of the centrifuge removed from its casing;

Fig. 3 is a transverse cross-section through the sliding cross-head of the centrifuge;

Fig. 4 is a detail showing one half of the sliding member;

Fig. 5 is another form of centrifuge embodying my invention,

Fig. 6 is a friction drive mechanism that may be used with this invention;

Fig. 7 is a view of the friction drive at right angles to Fig. 6;

Fig. 8 is a detail partly in section showing one shaft of the friction drive;

Fig. 9 shows the mounting of the arms of the friction drive mechanism with the detector means;

Fig. 10 is a diagram showing the application of the differential detector used with the friction drive;

Fig. 11 is a plan view of the differential detector shown in Fig. 10.

Figure 1:
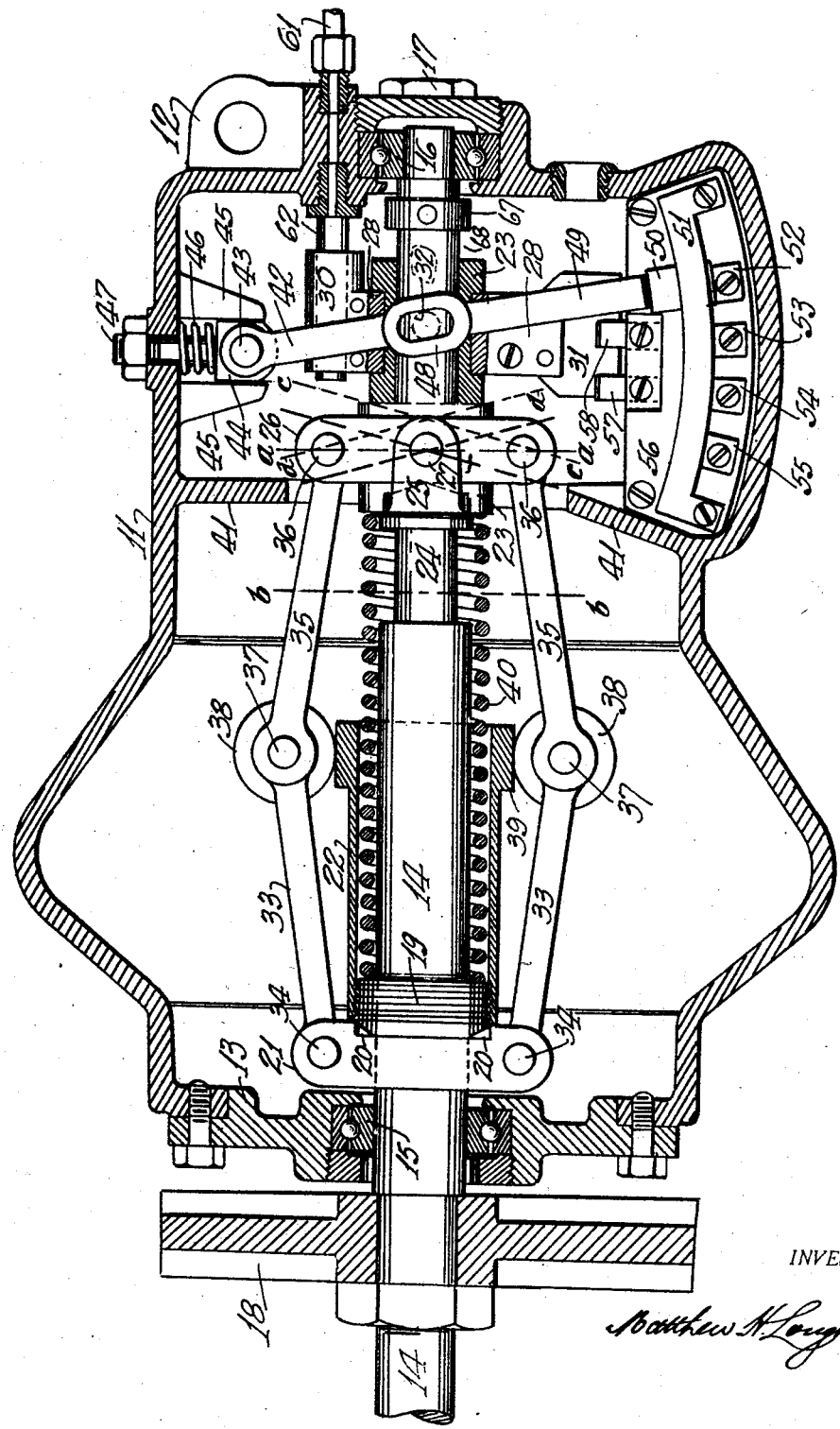

This invention includes a centrifuge which is driven by a moving part of a vehicle or other mechanism and operates a sliding member against a spring proportionally to the speed of the vehicle. It is thus driven to its operative position and includes a number of moving parts. If the drive should fail, or if any of these moving parts should be broken or disconnected, or if the spring should become broken, means is provided in the construction of the centrifuge and its drive to detect these failures and thus prevent unsafe conditions being established.

The centrifuge is driven by a duplex or double friction drive comprising a pair of friction wheels engaging one of the running wheels each of which is mounted on a pivoted arm and an abnormal displacement of these arms, or the failure of each friction wheel to drive at the same speed will operate a detector, thus indicating unsafe conditions.

When applied to a train control system, the system may be operated through a shoe and ramp system or may be applied to any inductively operated system. The shoe as herein provided is displaced by the ramp to make the speed control effective through a circuit controller which makes a complete operation on the initial movement of the shoe.

The self detecting centrifuge

This centrifuge is provided with a sliding cross-head on the main shaft which is coupled by arms to weights which move the cross-head in one direction as the speed increases and a spring which moves it in the opposite direction as the speed decreases. The cross-head has a starting position at zero speed and a stopping position at maximum speed the latter being determined by the ultimate compression of the spring. The centrifuge in its normal operation moves the cross-head between these two positions. Provision is made whereby the cross-head may be moved beyond the zero position in one direction, if any of its moving parts are broken or disconnected and may be moved beyond the maximum position in the opposite direction if the spring is broken or loses its resistance. When the cross-head moves beyond its normal position in either direction, it operates a circuit controller and brings a detector into operation, or it may operate an air valve controlling an air translating device.

A self detecting centrifuge is described in U. S. Patent 1,627,567, issued to me on May 10, 1927. The present invention is simpler in construction and less expensive to maintain than that described in the patent.

In the drawings, 11 is the housing which is provided with a supporting lug 12 and a removable end 13. The main shaft 14 which is of various diameters, is centered in the housing on ball bearings 15 and 16. The outer end is enclosed by the cap 17 and the driving gear 18 is suitably keyed to this shaft.

The threaded collar 19 of the shaft supports the tube 22 and is notched at 20 to receive the fixed cross-head 21. The sliding cross-head 23 is mounted to slide on the reduced section of the shaft 24 and engages the spring 40 at its inner end. A pair of diametrically opposed jaws 25 are formed integral with the sliding cross-head and carry the floating or balancing levers 26 through the pivots 27.

The sliding cross-head 23 is grooved to receive the split collar 28—29 which thus moves back and forth with the cross-head. This collar is provided with a head 30 apertured to receive the stem 62 of an air line, hereinafter more particularly described; also, it carries the insulated contact plate 31 making contact with circuit closers 57 and 58.

The operating parts of the centrifuge comprise the arms 33 which are pivoted at 34 to the fixed cross-head 21 and the arms 35 which are pivoted at 36 to the floating levers 26 of the sliding cross-head; the arms 33 and 35 are pivoted at 37 to the weights 38. When at rest as shown, the weights 38 bear upon the collar 39 of the tube 22. The operating parts of the centrifuge described are separated from the sliding parts by the interior wall 41 of the housing, thereby preventing damage to the sliding parts in case of breakage of the rotating parts.

The operating arm 42 is pivoted at 43 in the sliding block 44 which is guided by the fingers 45 and is adjusted by the screw 47 acting against the spring 46. A slot is formed in the arm 42 at 48 which engages the pivot 32 on the collar 28—29. The arm 42 is continued by the extension 49 and terminates in the insulated contact piece 50. This contact piece is wedge shaped as shown in Fig. 3 and moves between the bar 51 and the contacts 52, 53, 54 and 55 according to the speed of shaft 14. These parts are mounted on a block of insulation 56 so that electric circuits may be controlled by these contacts.

It will be noted from Fig. 3 that the operating arm 42 is forked to straddle the collar 28—29. This construction constitutes a lever which moves the contact 50 over a distance much greater than the movement of the sliding cross-head 23 and which can be adjusted, while the centrifuge is in motion if necessary, by adjusting the position of pivot 43 relative to the pivot 32 by screw 47. The plate 51 bears on the wedge 50 with a spring action to compensate for any movement of arm 49. It will be noted that spring 46 tends to hold the wedge 50 in contact with 51 and if the wedge should bind in its movement the spring 46 will release the pressure and the binding. The wedge 50 may be made rectangular instead of wedge shaped but the wedge is preferred where it is used to make contact between two fixed parts. Should the arm 49 become broken the wedge would be forced out of place and thus the circuit would be interrupted.

In operation, the inward movement of cross-head 23 reaches its maximum when spring 40 is fully compressed as indicated by line $b$—$b$. If the spring is broken or has lost its resistance the cross-head will be free to move, under speed, until it is engaged by the enlarged section 14 of the shaft. When this occurs the contact 50 has moved beyond the last contact 55, and the plate 31 has moved beyond the contact 58 and opened the circuit between 57 and 58; also the air supply connected to pipe 61 and entering the head 30 through passage 63 of stem 62, Fig. 4, escapes through the port 64 which is uncovered at the right hand end of the head. Thus this abnormal movement of the sliding cross-head to the left is detected by three abnormal movements of the mechanism.

The sliding cross-head is shown in the zero position with the centrifuge stopped in Fig. 1. If the upper arms 33—35 should become broken or disconnected the upper connection of the balancing lever 26 would be released and the centre of this lever would fall along the line $c$—$c$ being moved outwards by the spring 40 until the stop collar 67 was engaged thus taking up the free space 68 on the shaft. The same conditions will apply if the arms 33 or 35 on the lower side are disconnected permitting the lever 26 to take up the position of line $d$—$d$ and thus increasing the movement of the sliding cross-head beyond the zero position. It should be observed that any condition producing unbalancing in the tension of the balancing levers will cause the sliding cross-head to make an abnormal movement by means of which the improper operation is detected.

When the sliding cross-head moves against the stop 67, the air port 64 in stem 62 is uncovered from the left end of the head 30, the contact plate 31 is moved away from the contact finger 57 thus opening the circuit between 57 and 58 and the contact wedge 50 is moved away from the contact 52. The two latter conditions operate circuits as hereafter described including a translating device which detects the failure of the apparatus. The air supply in pipe 61 is also connected to an indicating means, not shown, which shows when abnormal conditions are present.

From Fig. 4 it will be noted that the air supply in stem 62 is led through the long slot 65 to the annular groove 66 which is placed on the sliding head 23. This air supply is confined in this groove under normal conditions, but if the collar 28—29 should become loose or broken the air will escape and the failure of this part thereby detected.

In the apparatus described, the centrifuge has a pair of weights and a plural connection to the sliding cross-head. The construction is much simpler where a single connection is made to the sliding head, as shown in Fig. 5. The driven stem 75 rotates in the bearings 76 and supports the weight in the form of a wheel 77 on the cross shaft 78 which is secured to 75 at 79. The single connection 80 is pivoted to the wheel 77 and to the sliding cross-head 82 at 81. This cross-head operates against the spring 83 resting on collar 84. In the position of rest shown, the rod 80 holds the cross-head away from the stop collar 85. If this rod is broken or disconnected the cross-head will move beyond its normal position and open the circuit controlled by 31. The limit of movement in the opposite direction is reached before the wheel 77 becomes horizontal and if spring 83 is defective, the wheel in assuming the horizontal position will open the circuit controlled by 31.

*The friction drive*

The centrifuge just described may be directly geared to a rotating part of the mechanism which it controls, or it may be operated by a friction drive through a friction wheel engaging a rotating part of the mechanism. The friction drive shown in Figs. 6 and 7 has a pair of friction wheels engaging a running wheel of the vehicle and geared to a common shaft upon which the centrifuge is mounted. The friction wheels are supported by arms moving on a common pivot and are held in spring engagement with the running wheel. These arms occupy a defined position and if a friction wheel is lost, or if the spring is defective the arms are displaced from this position and operate a detector device which registers a dangerous condition. In addition, the friction wheels must rotate at the same speed. Should the shaft of one wheel rotate faster than the shaft of the other, a differential mechanism is provided which detects this condition.

A centrifuge of this type is described in U. S. Patent 1,627,567 issued to me on May 10, 1927, but without the detector features herein outlined.

In the drawings, 101 is the running wheel of a railway vehicle, 102 is the axle, 103 is the bearing, 104 is the spring and 105 is the frame supported by the bearing 103 which frame carries the friction wheels. The frame, 105, preferably, rises vertically from the axle and supports the horizontal shaft 14 upon which the deflecting arms 107 and 108 are pivotally mounted as at 109, Fig. 9. The arm 107 terminates in a lug 110 and the arm 108 terminates in an opposed lug 111 and between these lugs the compression spring 112 is placed which tends to force the arms together at the base. It will be noted that the arms 107 and 108 are provided in duplicate and form a two point suspension for each barrel 106 which is thus maintained parallel with the axle 102 and is free to swing through an arc from the shaft 14.

A sleeve bearing 113 is mounted to rotate in each barrel 106 and has secured thereto the driving gear 114. The shaft 115 is mounted in the sleeve 113 which it engages by the key 116 in the spline 117. The friction wheel 118 is mounted on one end of this shaft and the opposite end is provided with the coil spring 119. In this construction it will be noted that the friction wheels 118 ride upon the periphery of wheel 101 and are held in engagement therewith by the springs 112. They are also held against the flanges of the wheel by the springs 119. The friction wheels can thus accommodate themselves to flat spots on wheel 101 and to any transverse movement of the axle in the bearing, being arranged to occupy the same position on the conical face of wheel 101.

The centrifuge 120 is supported by the frame 121 and is gear connected through 18 and 114 with the sleeve 113 and shaft 115 of the friction wheels. The three phase motor 122 is mounted on shaft 14 which is a continuation of the shaft of the centrifuge.

The arm 108, Fig. 9, is connected by a link 123 with the slide 124 which establishes a circuit through the contacts 126. This slide is opposed by the spring 125 so that if the link 123 is disconnected the slide is moved to open the circuit. A corresponding link and slide is connected with the arm 107 and establishes a circuit through the contacts 127 when the arm is in the normal position.

It will be seen that if one of the friction wheels is lost or misplaced, its supporting arm will collapse towards the centre, moving the slide 124 to open the circuit; also if the springs 112 lose their resistance, the arms will be free to move outwards and will move outwards upon any irregularity engaging the friction wheels, thereby moving the slide 124 to open the circuit. The detector circuit thus operates to detect the failure of the spring which holds the friction wheel in engagement with the running wheel and to detect the misplacement of the friction wheel on the running wheel.

The friction wheels are both of the same diameter and should drive at the same speed. The connection through gear 18 insures that both of these wheels rotate at the same speed. This connection, however, is made effective through the key 116 and spline 117 and if this key should shear off an unequal rotation of the two friction wheels would gradually ensue. This condition is detected by a differential mechanism one element of which is driven by one of the friction wheels and the other element is driven by the other friction wheel and the movement of the planetary member due to the difference in rotation of these elements interrupts a circuit through a detector device.

The shaft of one of the friction wheels carries a belt pulley 131 and the shaft of the other friction wheel carries a belt pulley 132. Pulley 131 by belt 134 drives pulley 133 connected with one element of the differential mechanism mounted on an extension of shaft 14, and pulley 132 by the crossed belt 136 drives pulley 135 connected with the other element of the differential mechanism, in the opposite direction to pulley 133. Between pulley 133 and pulley 135, Fig. 11, the planetary member 137 is mounted. This member carries a contact plate 138 engaging a pair of contacts when in the normal position said contacts controlling the circuit of the detector device. When the pulleys 133 and 135 rotate in opposite directions at the same speed, the member 137 is stationary and when these pulleys have a difference in speed, member 137 is rotated in accordance with this difference to open the circuit at 138 and operate the detector device. The various circuits referred to are described in detail below. Spur gears may be substituted for the driving belts 134 and 137 shown in the drawings.

The block system

Figure 12:
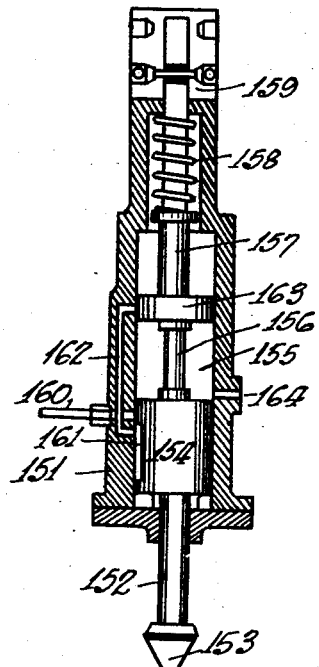
Fig. 12 is a shoe that may be applied to a railway vehicle to operate a train control system embodying this invention.
Figure 13:
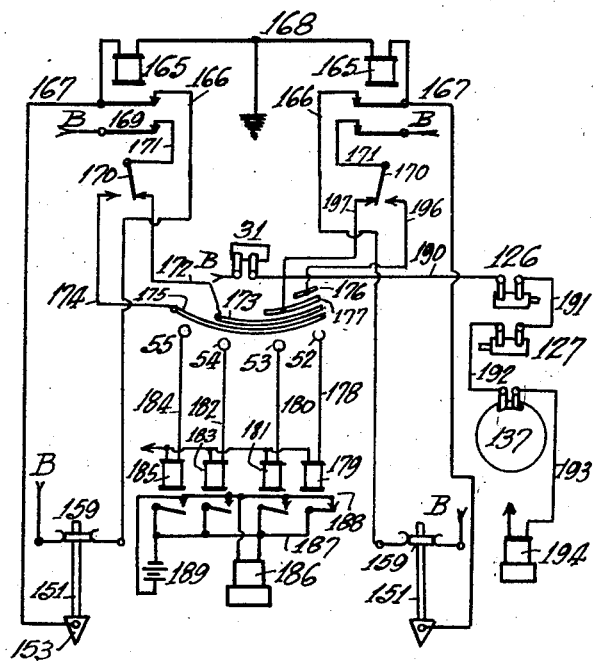
Fig. 13 is a diagram of the locomotive circuits embodying this invention.
Figure 14:
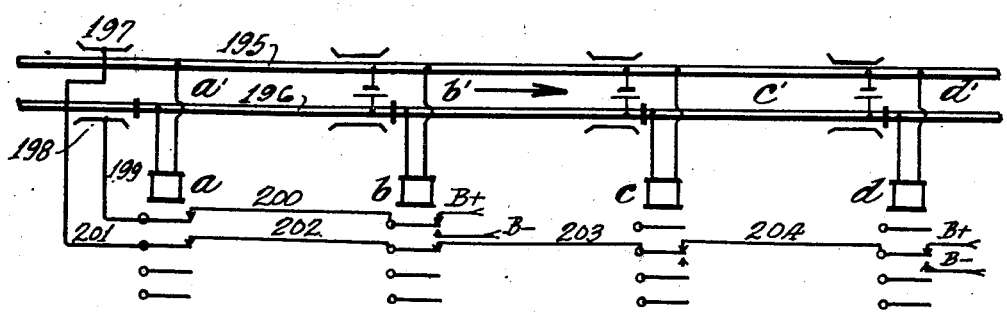
Fig. 14 is a track plan equipped for operation with the circuits in Fig. 13.

In applying the speed control system described to a railway train, the application of the system should be restricted to correspond with traffic conditions as determined by a block system or other speed limiting restrictions on the trackway. A typical block system with speed control for railway trains is shown in Figs. 12, 13 and 14 which illustrates one way in which this invention may be used.

This system is operated by a ramp on the track engaged by a shoe on the vehicle. One form of shoe for this purpose is shown in Fig. 12. This comprises the cylinder 151 with the plunger 152, the insulated contact shoe 153 and the piston 154. This piston works in the cylinder 155 and engages the stem 156 raising the stem 157 and compressing the spring 158 as plunger 152 is raised. The end of plunger 157 carries the contact 159 which opens a circuit when 152 is raised.

The shoe 153 engages the ramp but the ramps are not of uniform height and due to wear and other conditions the extent of the displacement of the shoe varies on each ramp. It is desirable that the impact between the shoe and the ramp be reduced as much as possible and for this purpose the normal pressure on the shoe before it is displaced is comparatively light; however, as the shoe makes contact with the ramp to establish a circuit it is necessary that the pressure be increased as the shoe passes over the ramp. For this purpose the initial displacement of the shoe introduces power from the vehicle to the cylinder which increases the pressure on the shoe and completes the movement of plunger 157.

When the shoe makes its initial movement the slide valve 161 formed in piston 154 connects the air pressure in pipe 160 with passage 162 which connects with cylinder 155 and thus applies air pressure between the pistons 154 and 163. This causes the piston 163 to move against the stop at the top of the cylinder and complete its stroke without regard to the further movement of 153. At the same time air pressure is applied to piston 154 which increases the pressure of 153 against the ramp and thereby insures a reliable contact with the ramp. When 153 moves away from the ramp the plunger 152 is moved downwards by the air pressure until pipe 160 is closed and cylinder 155 is opened to exhaust through port 164 and the spring 158 restores the plunger 157 and contact 159.

A typical track layout is shown in Fig. 14 in which the track is divided into sections $a'$, $b'$, $c'$ and $d'$ with the track relays $a$, $b$, $c$ and $d$ for each of these respective sections according to standard railroad parctice. The track rails are indicated by 195 and 196 and each section is provided with ramps at its entrance as indicated by 197 on one side of the track and by 198 on the other side of the track. The ramp 198 is controlled by wire 199, front contact on relay for section $a$, wire 200, front contact on relay $b$ to positive battery (B+) and the back contact on the same relay to negative battery (B−). The ramp 197 is controlled by wire 201 through front contact on relay $a$, wire 202, front contact on relay $b$, wire 203, front contact on relay $c$, wire 204 and front contact on relay $d$ to positive battery (B+) and the back contact on the same relay to negative battery (B−). Thus ramp 198 is energized positively when block $a'$ is clear and when block $b'$ is clear but is energized negatively when block $a'$ is clear and block $b'$ is occupied. Ramp 197 is energized when blocks $a'$, $b'$ and $c'$ are clear and is energized positively when block $d'$ is clear and is energized negatively when this block is occupied.

The locomotive wiring in Fig. 13 comprises a duplicate set of elements on each side to co-act with the ramps on each side of the track. The block relay 165 is grounded on wire 168 and by wire 167 connects to the point of the shoe 153 which engages either ramp so that when the ramp is energized this relay is picked up by current from the shoe, the return circuit being through the ground rail 195 to which one side of the battery energizing the ramps is connected. The block relay is a stick relay with a holding circuit on wire 166 which is controlled by contact 159 of the shoe. When the shoe is displaced by a ramp the holding circuit is interrupted and the block relay will be deenergized unless the ramp is energized. A pair of block relays are provided operated by the shoes on each side of the vehicle by circuits correspondingly referenced.

The block relay is provided with a polarized armature 170 which responds to the polarity of the current in the ramps as well as the neutral armature which is picked up when the ramp is energized. Each block relay is thus capable of selectively giving an indication for two blocks and the pair of block relays are capable of giving indications for the four blocks, $a'$, $b'$, $c'$ and $d'$ in Fig. 14.

When the block relay 165 to the right is energized with current which moves the polarized armature 170 to the right the bar 176 may be energized by wire 196. When armature 170 is moved to the left by current of opposite polarity, bar 177 may be energized by wire 197. When the block relay 165 to the left is energized with current which moves armature 170 to the right, bar 173 may be energized through wire 172 and when it is energized with current which moves this armature to the left bar 175 may be energized through wire 174. The circuits are so arranged that the length of these bars corresponds to the length of track that is clear, bar 176 representing one block, bar 177 representing two blocks, bar 173 representing three blocks and bar 175 representing four blocks.

The contact wedge 50 of the centrifuge is adapted to connect these bars with the contacts 52, 53, 54 and 55. Relay 179 connecting with contact 52 by wire 178 and representing low speed is energized when any of the bars are energized. Relay 181 connecting with contact 53 by wire 180 is energized when any of the bars are energized except bar 176. Relay 183 connecting with contact 54 by wire 182 is energized when either bars 173 or 175 are energized and relay 185 connecting with contact 55 by wire 184 is energized when bar 175 is energized, representing maximum speed. The contact member 50 establishes one circuit before interrupting another in moving over contacts 52, 53, 54 and 55. The relays 179, 181, 183 and 185 control the circuit of the detector valve 186 through wires 187, 188 and battery 189. This valve may be arranged to apply the brakes on the vehicle or otherwise indicate when a dangerous speed has been reached.

Another detector valve 194 is controlled by a series circuit starting at battery B, contact 31 on the sliding head of the centrifuge, wire 190, contact 126 on one arm of the friction drive, wire 191, contact 127 on the other arm of the friction drive, wire 192, differential member 137 and wire 193. This valve is de-energized when the circuit is interrupted at any of these control points thereby indicating an unsafe condition.

Having thus described my invention, I claim:

1. A centrifuge as described comprising a rotating shaft with pivotally connected arms, weights supported by said arms, a sliding cross-head on said shaft, said cross-head connected with said weights through a balanced connection and a detector device operated by said cross-head when said connection is unbalanced.

2. A centrifuge as described comprising a rotating shaft with a pivotally connected arm, a weight supported by said arm, a sliding cross-head on said shaft connected with said arm and having a normal operation from the position of rest to the position of maximum speed and means embodied in said centrifuge and independent of the normal operation of said cross-head for detecting when said cross-head moves beyond said normal operation.

3. A centrifuge as described comprising a rotating shaft with a pivotally connected arm, a weight supported by said arm, a sliding cross-head on said shaft connected with said arm and having a normal position of rest and means embodied in said centrifuge and for detecting when said cross-head moves beyond said position of rest.

4. A centrifuge as described comprising a rotating shaft with a pivotally connected arm, a weight connected with said arm, a sliding cross-head on said shaft connected with said arm and having a normal position of maximum speed and means embodied in said centrifuge and independent of the normal operation of said device for detecting when said cross-head moves beyond said position of maximum speed.

5. A centrifuge as described comprising a rotating shaft with a pivotally connected arm, a weight connected with said arm, a sliding cross-head on said shaft connected with said arm, and having a sliding movement in excess of its normal movement, a spring opposing the movement of said cross-head and means separate from the normal operation of the device for detecting when said spring loses its resistance to said excess movement.

6. A centrifuge as described comprising a rotating shaft with a pivotally connected arm, a weight connected with said arm, a sliding cross-head on said shaft connected with said arm and having a normal movement between high and low speeds in the operation of the centrifuge and a lever operated by said cross-head for detecting when said normal movement is exceeded.

7. A centrifuge as described comprising a rotating shaft with pivotally connected arms, weights supported by said arms, a sliding cross-head on said shaft connected with said arms and operated by said arms, detector means associated with said cross-head and means for operating said detector means when the force exerted by said arms on said cross-head is unequal.

8. A centrifuge as described comprising a rotating shaft with a pivotally connected arm, a weight connected with said arm, a sliding cross-head on said shaft connected with said weight and an adjustable lever mounted on a movable pivot connected with said cross-head controlling a mechanism according to the speed of the centrifuge.

9. A centrifuge as described comprising a shaft with a pivotally connected arm, a weight connected with said arm, a sliding cross-head on said shaft connected with said arm, a wedge-shaped contact piece engaging contacts said contact piece connected with said cross-head and a spring for holding said contact piece in engagement.

10. A centrifuge as described for establishing conditions of speed comprising a rotating shaft, a weight and a cross-head connected with said weight, means additional to said speed conditions for maintaining a circuit by said cross-head as long as said connection between said weight and cross-head is maintained and means for interrupting said circuit when said connection is interrupted.

11. A centrifuge as described for establishing conditions of speed comprising a rotating shaft, a weight and a cross-head connected with said weight, means excluding said conditions of speed for maintaining an inactive condition as long as said connection between said weight and cross-head is maintained and means for making this condition active when said connection is interrupted.

12. In a centrifuge as described, the combination, a rotating shaft, a weight and a sliding cross-head connected with said weight, an arm carrying a friction wheel for driving said shaft pivoted to move in the direction of the frictional engagement of said wheel, and a circuit established by said arm in its normal position and interrupted when said arm is moved out of its normal position.

13. In a centrifuge as described, the combination, a rotating shaft, a weight and a sliding cross-head connected with said weight, an arm carrying a driving wheel for said shaft said arm swinging on a pivot, a detective device and means for maintaining said detective device inactive when said arm is in its normal position and for making it active when said arm is moved out of its normal position.

14. In a centrifuge as described, the combination, a rotating shaft, a weight and a sliding cross-head connected with said weight, a plurality of pivoted arms carrying driving wheels for said shaft, a detective device and means for maintaining said device inactive when said arms and cross-head are in their normal positions and for making it active when they are moved out of their normal positions.

15. A centrifuge as described comprising a rotating shaft, a cross-head fixed on said shaft and a cross-head slidably mounted on said shaft, a coil spring on said shaft opposing the movement of said sliding cross-head in one direction, centrifuge weights linked to said cross-heads and a tubular sleeve partially enclosing said coil spring secured to said fixed cross-head and arranged to engage said weights in the collapsed position.

16. A centrifuge as described comprising a rotating shaft, a cross-head fixed on said shaft and a cross-head slidably mounted on said shaft, a coil spring on said shaft opposing the movement of said sliding cross-head in one direction, centrifuge weights located opposite said spring and linked to said cross-heads and means free of said spring secured to said fixed cross-head forming a rest for said weights in the collapsed position whereby the movement of said sliding cross-head is limited.

17. A centrifuge as described comprising a rotating shaft, a cross-head slidably mounted on said shaft, centrifuge weights linked to said cross-head, an operating arm pivotally mounted on said cross-head and means including a spring for adjusting the effective length of said arm on said mounting.

18. A centrifuge as described comprising a rotating shaft, a cross-head slidably mounted on said shaft, centrifuge weights linked to said cross-head and an operating arm adjustably pivoted at one end on an adjustably mounted pivot and operatively connected with said cross-head.

19. A centrifuge as described comprising a rotating shaft, a slidably mounted cross-head, a pair of levers pivotally mounted at their centres on said cross-head, centrifuge weights linked to said levers and an operating mechanism associated with said cross-head.

20. A centrifuge as described for determining conditions of speed comprising a rotating shaft, a slidably mounted cross-head, centrifuge weights linked to said cross-head and moving said cross-head in accordance with the speed of said shaft means for mechanically restricting the movement of said cross-head, under normal operation and for releasing said restriction under abnormal conditions and means additional to the normal operation of said centrifuge associated with said cross-head for maintaining a circuit during the normal movement of said cross-head and for interrupting said circuit under abnormal conditions.

21. A centrifuge as described comprising a rotating shaft, a slidably mounted cross-head, centrifuge weights linked to said cross-head and moving said cross-head in accordance with the speed of said shaft means for restricting the movement of said cross-head under normal operation and for releasing said restrictions under abnormal conditions, an air valve, and means associated with said cross-head for maintaining said valve closed during the normal movement of said cross-head and for opening said valve under abnormal conditions.

22. In a centrifuge as described, the combination, a rotating shaft, a sliding cross-head, centrifuge weights linked to said cross-head, an operating mechanism associated with said cross-head, a pair of friction wheels engaging a driving wheel, an arm for each friction wheel mounted on a common pivot and means operatively connecting said friction wheels with said rotating shaft.

23. The combination, a centrifuge having a rotating shaft and an operating mechanism, a driving wheel, a pair of friction wheels engaging said driving wheel, an arm for each friction wheel mounted on a common pivot, a spring engaging said arms for holding said wheels in frictional engagement with said driving wheel and means operatively connecting said friction wheels with said rotating shaft.

24. The combination, a centrifuge having a rotating shaft and an operating mechanism, a driving wheel, a pair of friction wheels, an arm mounted on a common pivot for each friction wheel, means for engaging said friction wheels with said driving wheel by an equalized engagement and means operatively connecting said friction wheels with said rotating shaft.

25. The combination, a centrifuge having a rotating shaft and an operating mechanism, a driving wheel, a pair of friction wheels, means supporting said wheels to move about a common centre in frictional engagement with said driving wheel and means rotating about said common centre connecting said friction wheels with said rotating shaft.

26. A driving mechanism for a centrifuge comprising a running wheel, a frame, a friction wheel with a shaft, an arm pivoted to said frame and supporting said shaft with said friction wheel in engagement with the running wheel, a centrifuge driven by said friction wheel and detector means for detecting when said friction wheel is disengaged from said running wheel.

27. A driving mechanism for a centrifuge comprising a running wheel, a frame, a pair of independent arms pivotally connected with said frame, friction wheels supported by said arms in engagement with said running wheel, a centrifuge driven by said friction wheel and means for detecting when said arms are moved from the position in which said friction wheels engage said running wheel.

28. A driving mechanism for a centrifuge comprising a running wheel, a frame, a pair of independent arms pivotally connected to said frame each having a shaft, a friction wheel on each of said shafts engaging said running wheel, a centrifuge driven by said friction wheels and detector means for detecting when said shafts rotate at different speeds.

29. A driving mechanism for a centrifuge comprising a running wheel, a frame, a pair of independent arms pivotally connected to said frame each having a shaft with a friction wheel in engagement with said running wheel, a centrifuge connected with said shafts, a differential mechanism operatively connected with said shafts and means associated with said differential mechanism for detecting when said shafts rotate at different speeds.

In testimony whereof I affix my signature.

MATTHEW H. LOUGHRIDGE.